(12) United States Patent
Zheng et al.

(10) Patent No.: US 8,004,932 B2
(45) Date of Patent: Aug. 23, 2011

(54) IDENTIFICATION OF STRESS IN FORMATIONS USING ANGLES OF FAST AND SLOW DIPOLE WAVES IN BOREHOLE ACOUSTIC LOGGING

(75) Inventors: Yibing Zheng, Houston, TX (US); Daniel Moos, Palo Alto, CA (US); Xiao Ming Tang, Sugar Land, TX (US); Vladimir Dubinsky, Houston, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 289 days.

(21) Appl. No.: 12/353,159

(22) Filed: Jan. 13, 2009

(65) Prior Publication Data

US 2009/0185446 A1    Jul. 23, 2009

Related U.S. Application Data

(60) Provisional application No. 61/055,300, filed on May 22, 2008, provisional application No. 61/011,466, filed on Jan. 18, 2008.

(51) Int. Cl.
  *G01V 1/28*      (2006.01)
(52) U.S. Cl. ............... 367/75; 367/32; 702/11
(58) Field of Classification Search ............ 33/304; 175/40, 50; 181/104, 105; 364/422; 367/25, 367/27, 28, 31, 32, 33, 38, 40–41, 49, 421; 702/6, 9, 14, 18; 703/5
See application file for complete search history.

(56) References Cited

U.S. PATENT DOCUMENTS

| | | | | |
|---|---|---|---|---|
| 5,398,215 A  * | 3/1995 | Sinha et al. | ..................... | 367/31 |
| 6,714,480 B2 * | 3/2004 | Sinha et al. | ..................... | 367/31 |
| 7,035,165 B2 * | 4/2006 | Tang | ............................... | 367/28 |
| 7,181,380 B2 | 2/2007 | Dusterhoft et al. | | |
| 7,310,285 B2 * | 12/2007 | Donald et al. | .................. | 367/40 |
| 2007/0168167 A1 * | 7/2007 | Lou | ................................... | 703/5 |

OTHER PUBLICATIONS

X. M. Tang et al.; "Identifying and Estimating Formation Stress From Borehole Monopole and Cross-Dipole Acoustic Measurements," Paper QQ, 42nd Annual Meeting Transactions: Society of Professional Well Log Analysts, 1999, pp. 1-14.
B. K. Sinha et al.; "Stress-induced azimuthal anisotropy in borehole flexural waves," Geophysics, vol. 61, No. 6, Nov.-Dec. 1996, pp. 1899-1907.
K. W. Winkler et al.; "Effects of borehole stress concentrations on Dipole anisotropy measurements," Geophysics, vol. 63, No. 1, Jan.-Feb. 1998, pp. 11-17.
R. M. Alford; "Shear Data in the Presence of Azimuthal Anisotropy: Dilley, Texas," Expanded Abstracts, 56th SEG Annual International Meeting, Houston, Nov. 2-6, 1986, pp. 476-479.
D. A. Castillo et al.; "Trap Integrity in the Laminaria High-Nancar Trough Region, Timor Sea: Prediction of Fault Seal Failure Using Well-Constrained Stress Tensors and Fault Surfaces Interpreted From 3D Seismic," APPEA Journal, 2000, pp. 151-173.

(Continued)

*Primary Examiner* — Jack Keith
*Assistant Examiner* — Daniel L Murphy
(74) *Attorney, Agent, or Firm* — Mossman Kumar & Tyler PC

(57) ABSTRACT

Cross-dipole measurements are obtained in a borehole. By estimating a direction of polarization of the fast shear mode at low and high frequencies and comparing the estimated distances, a cause of anisotropy is established. Formation stresses and directions may be estimated.

19 Claims, 10 Drawing Sheets

OTHER PUBLICATIONS

D. Moos; "Geomechanics Applied to Drilling Engineering," Petroleum Engineering Handbook, vol. II, Larry W. Lake, Editor-in-Chief, SPE, pp. 1-87.

P. Peska et al.; "Compressive and tensile failure of inclined well bores and determination of in situ stress and rock strength," Journal of Geophysical Research, vol. 100, No. B7, Jul. 10, 1995, pp. 12,791-12,811.

V. Pistre et al.,; "A Modular Wireline Sonic Tool for Measurements of 3D (Azimuthal, Radial, and Axial) Formation Acoustic Properties," Paper P, SPWLA 46th Annual Logging Symposium, Jun. 26-29, 2005, pp. 1-13.

R. A. Plumb et al.; "A New Geomechanics Process Reduces Operational Risk from Exploration to Production," ARMA/NARMS 04-616, Gulf Rocks 2004, 6th North America Rock Mechanics Symposium (NARMS), Houston, Texas Jun. 5-9, 2004, 11 pages.

C. M. Sayers et al.; "Microcrack-induced elastic wave anisotropy of brittle rocks," Journal of Geophysical Research, vol. 100, No. B3, Mar. 10, 1995, pp. 4149-4156.

B. K. Sinha; "Near-wellbore characterization using radial profiles of shear slownesses," SEG Int'l. Exposition and 74th Annual Meeting, Denver, Colorado, Oct. 10-15, 2004, pp. 326-329.

B. K. Sinha et al.; "Estimation of Formation Stresses Using Radial Variation of Three Shear Moduli—A Case Study From a High-Pressure and High-Temperature Reservoir in a Norwegian Continental Shelf," SPE 109842, 2007 SPE Annual Technical Conference and Exhibition, Anaheim, California, Nov. 11-14, 2007, pp. 1-9.

J. B. U. Haldorsen et al.; "Borehole Acoustic Waves," Oilfield Review, Spring 2006, pp. 34-43.

A. S. Wendt et al.; "Enhanced Mechanical Earth Modelling and Wellbore Stability Calculations Using Advanced Sonic Measurements—A Case Study of the HP/HT Kvitebjorn Field in the Norwegian North Sea," SPE 109662, 2007 SPE Annual Technical Conference and Exhibition, Anaheim, California, Nov. 11-14, 2007, pp. 1-16.

M. D. Zoback et al.; "Determination of stress orientation and magnitude in deep wells," International Journal of Rock Mechanics and Mining Sciences, 40, 2003, pp. 1049-1076.

* cited by examiner

IDENTIFICATION OF STRESS IN FORMATIONS USING ANGLES OF FAST AND SLOW DIPOLE WAVES IN BOREHOLE ACOUSTIC LOGGING

CROSS-REFERENCES TO RELATED APPLICATIONS

This application claims priority from U.S. Provisional Patent Application Ser. No. 61/055,300 filed on May 22, 2008 and from U.S. Provisional Patent Application Ser. No. 61/011,466 filed on Jan. 18, 2008.

BACKGROUND OF THE DISCLOSURE

The invention is related to the field of acoustic velocity well logging. More specifically, the disclosure is related to methods of processing receiver signals from an acoustic well logging instrument to determine certain shear wave propagation properties and stress of earth formations.

BACKGROUND OF THE ART

In an anisotropic formation, shear waves travel at different velocities with different propagating directions and polarizations. In borehole acoustic logging, the receivers are placed along the borehole axis, so that only the wave traveling along the borehole axis is measured. Borehole acoustic logging can measure the shear wave anisotropy with different polarizations around the borehole. This is called the azimuthal anisotropy.

In most cases, an anisotropic rock can be modeled as a transverse isotropic (TI) material. For example, layered structures such as the structure of shale, or layered fractures inside a rock, can cause such anisotropy, called intrinsic anisotropy. This material has one symmetry axis of infinite-fold rotational symmetry that is perpendicular to the layers. When the rock's symmetry axis is parallel to the borehole axis, we cannot observe any shear wave anisotropy from acoustic logging since the shear modes propagating along the axis for this geometry have the same velocity regardless of the direction of polarization. This kind of configuration related to the borehole is called vertically transverse isotropy or VTI. However, if there is an angle between the symmetry axis and the borehole axis, the measured shear modes have two phase velocities, corresponding to fast and slow modes with perpendicular polarization directions. In borehole dipole acoustic logging, we can observe the azimuthal anisotropy when dipole modes are excited at different azimuthal directions. The configuration in which the rock's symmetry axis is perpendicular to the borehole axis is called horizontally transverse isotropy or HTI. In this disclosure, we only discuss the HTI configuration for intrinsic anisotropy or anisotropy caused by parallel fractures. For HTI, the shear mode that is polarized along the fracture (or layer) direction has a faster velocity than the shear mode polarized perpendicular to the fractures.

Azimuthal anisotropy can also be induced by stress in the rock. Before a borehole is drilled, the rock itself may be pre-stressed. Stress can change the rock's elastic properties so that the shear wave polarized along the largest principal stress may have a different shear velocity than shear waves polarized perpendicular to the largest principal stress. This kind of anisotropy has a different character than the intrinsic anisotropy in borehole acoustic logging. The stress will redistribute around the borehole after the well is drilled, so that the stress distribution (both its magnitude and direction) near the borehole may be very different from that far away from the borehole. The latter is considered to have the same stress condition as before the borehole is drilled. This stress re-distribution causes the shear velocity to vary in both azimuthal and radial directions. A formation with intrinsic anisotropy is homogeneous around the borehole area, but the stress-induced anisotropy in such a medium is non-uniform. The present disclosure is directed towards practical methods to distinguish between these two kinds of azimuthal anisotropy caused by either fractures or stress, and to further characterize the stress-induced component.

A considerable amount of prior art exists in the field. U.S. Pat. No. 5,712,829 to Tang et al., having the same assignee as the present disclosure, discloses a method that can identify stress-induced anisotropy with the combination of dipole logging and the shear waves in monopole logging. In the stress-induced anisotropy case, the splitting of the fast and slow shear waves in a monopole waveform is more significant than the degree of shear wave splitting in the intrinsic anisotropy situation. If the difference between the two shear velocities from the monopole waveform is much larger than the measured anisotropy from cross dipole logging, this anisotropy is caused by formation stress. This method requires that the rock around the borehole is a fast formation so that the monopole waveform contains shear wave information.

SUMMARY OF THE DISCLOSURE

One embodiment of the disclosure is a method of characterizing shear wave anisotropy in a formation. The method includes obtaining cross dipole measurements over a range of frequencies over a range of depths in a borehole penetrating the formation; estimating a first azimuthal direction of a fast shear mode near the borehole using a high frequency component of the measurements; estimating a second azimuthal direction of a far-field fast shear mode using a low frequency component of the measurements; and using the estimated first azimuthal direction and the estimated second azimuthal direction for at least one of: (i) estimating a property of a stress field in the formation, and (ii) providing an indication of intrinsic anisotropy of the formation.

Another embodiment of the disclosure is an apparatus for characterizing an earth formation. The apparatus includes a logging tool configured to obtain cross dipole measurements over a range of frequencies over a range of depths in a borehole penetrating the formation; and at least one processor configured to estimate a first azimuthal direction of a fast shear mode near the borehole using a high frequency component of the measurements; estimate a second azimuthal direction of a far-field fast shear mode using a low frequency component of the measurements; and use the estimated first azimuthal direction and the estimated second azimuthal direction to provide at least one of: (A) an estimate of a property of a stress field in the formation, and (B) an indication of intrinsic anisotropy in the formation.

Another embodiment of the disclosure is computer-readable medium accessible to at least one processor. The computer-readable medium includes instructions which enable the at least one processor to: estimate from cross dipole measurements obtained over a range of frequencies over a range of depths in a borehole a first azimuthal direction of a fast shear mode near the borehole using a high frequency component of the measurements; estimate a second azimuthal direction of a far-field fast shear mode using a low frequency component of the measurements; and use the estimated first azimuthal direction and the second estimated azimuthal direction to provide at least one of: (i) an estimate of a property of a stress field in the formation, and (ii) an indication of intrinsic anisotropy of the formation.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

For detailed understanding of the present disclosure, reference should be made to the following detailed description of an exemplary embodiment, taken in conjunction with the accompanying drawing and in which.

DETAILED DESCRIPTION OF THE DISCLOSURE

The present disclosure is discussed with reference to specific logging instruments that may form part of a string of several logging instruments for conducting wireline logging operations. It is to be understood that the choice of the specific instruments discussed herein is not to be construed as a limitation and that the method of the present disclosure may also be used with other logging instruments as well.

Figure 1:
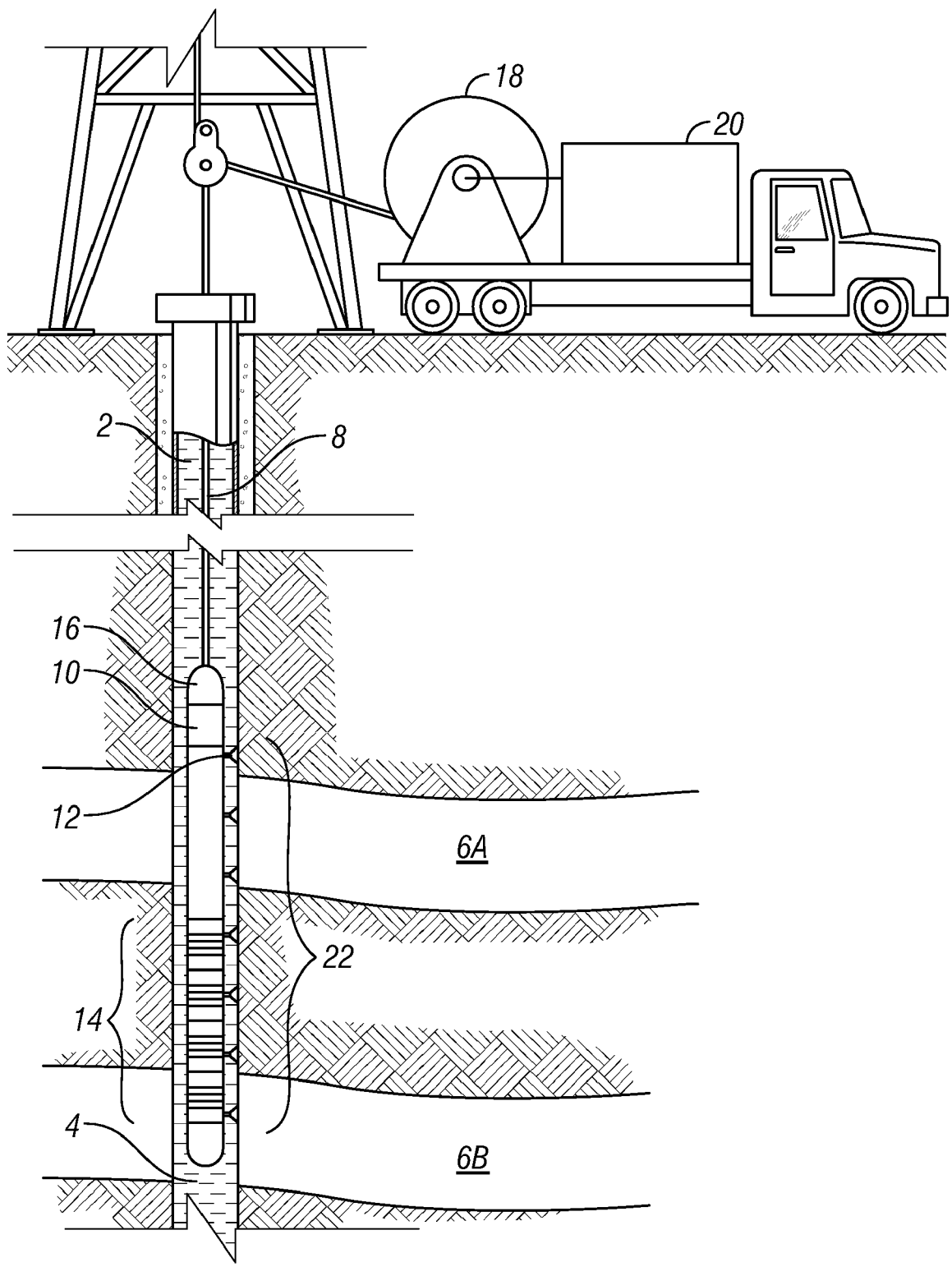
FIG. 1 is a schematic illustration of a wireline logging system.

A well logging apparatus suitable for performing the monopole and cross-dipole measurements disclosed herein is depicted in FIG. 1. An acoustic array borehole logging tool, shown generally at 10, is attached to one end of an armored electrical cable 8. The cable 8 is extended into a borehole 2 penetrating earth formations, shown generally at 6A and 6B. A winch 18, or similar device known to those skilled in the art, extends the cable 8 into the borehole 2. The borehole 2 is typically filled with a liquid 4 which is known to those skilled in the art as "drilling mud", or similar fluid. The liquid 4 enables transmission of acoustic energy from the tool 10 outwardly to the wall of the borehole 2.

Acoustic dipole transmitters are disposed on the tool 10 and shown generally at 12. These transmitters 12 periodically emit acoustic energy pulses shown generally at 22. The pulses 22 typically travel radially outwardly from the transmitter 12 through the fluid 4 in the borehole 2, until they strike the wall of the borehole 2. The pulses 22 then typically travel along the borehole 4 wall. Some of the acoustic energy returns to the fluid 4 in the borehole 2 and can be detected by a plurality of dipole receivers shown generally at 14 and disposed at axially spaced apart locations from the transmitter 12. The receivers 14 generate electrical signals corresponding to the amplitude of the acoustic energy reaching the receivers 14.

The tool 10 typically includes signal processing electronics, shown generally at 16, which can digitize the signals from the receivers 14 and impart the digitized signals to the cable 8. Signals imparted to the cable 8 can be transmitted to a surface electronics unit 20.

It is well known that stress can change the shear velocities of a rock, and thus may induce anisotropy in the formation. Consider a shear wave propagating in a direction perpendicular to the direction of compressive stress. The velocity of the shear wave polarized along the direction of compressive stress is larger than the shear wave polarized perpendicular to the direction of compressive stress. So if there are two perpendicular compressive stresses, $\sigma_x$ and $\sigma_y$, and the shear waves propagate along the z direction, the velocities of the two shear waves polarized along the x and y directions can be expressed as:

$$\begin{cases} v_x^2 = v_{0x}^2 + S_{//}\sigma_x + S_\perp\sigma_y \\ v_y^2 = v_{0y}^2 + S_{//}\sigma_y + S_\perp\sigma_x \end{cases} \quad (1),$$

where $v_{0x}$ and $v_{0y}$ are the initial shear velocities polarized along the x and y directions without stress, and $S_{//}$ and $S_\perp$ are the stress-velocity coefficients, This is discussed in U.S. Pat. No. 6,098,021 to Tang et al., having the same assignee as the present disclosure and the contents of which are incorporated herein by reference. If the two stress $\sigma_x$ and $\sigma_y$ are different, the velocities of the two shear waves are different as well, thus the anisotropy is induced.

From laboratory measurements, it is noted that sandstones usually have large stress-velocity coefficients. The values of $S_{//}$ and $S_\perp$ of the sandstones with high porosities are higher than those of the sandstones with low porosities. However, those coefficients are smaller in shale and are often neglected.

Unlike the situation with intrinsic anisotropy where the elasticity properties of a rock are homogeneous around a borehole, the anisotropy induced by the stress becomes a complicated issue when a borehole exists. The properties of the rock are no longer homogeneous.

Suppose that the formation is under uniform stress before the borehole is drilled. After the borehole is drilled, the stress will redistribute around the near-borehole area. At infinite distance, the stress should not change from its initial state. Assume that the borehole is drilled along the z direction through a linear elastic medium. Also consider that there are two stresses at infinity, $\sigma_x$ and $\sigma_y$, and a fluid pressure p inside borehole. The stress around the borehole can be calculated analytically in cylindrical coordinates (r, θ) by:

$$\begin{cases} \sigma_r = \frac{\sigma_x + \sigma_y}{2}\left(1 + \frac{R^2}{r^2}\right) + p\frac{R^2}{r^2} + \frac{\sigma_x - \sigma_y}{2}\left(1 + 3\frac{R^4}{r^4} - 4\frac{R^2}{r^2}\right)\cos 2\theta \\ \sigma_\theta = \frac{\sigma_x + \sigma_y}{2}\left(1 + \frac{R^2}{r^2}\right) - p\frac{R^2}{r^2} - \frac{\sigma_x - \sigma_y}{2}\left(1 + 3\frac{R^4}{r^4}\right)\cos 2\theta \\ \sigma_{r\theta} = -\frac{\sigma_x - \sigma_y}{2}\left(1 - 3\frac{R^4}{r^4} + 2\frac{R^2}{r^2}\right)\sin 2\theta \end{cases} \quad (2)$$

where θ is the angle between r and x, and R is the borehole radius. Similar equations characterize the stresses around a non-linear elastic medium.

Figure 2A:
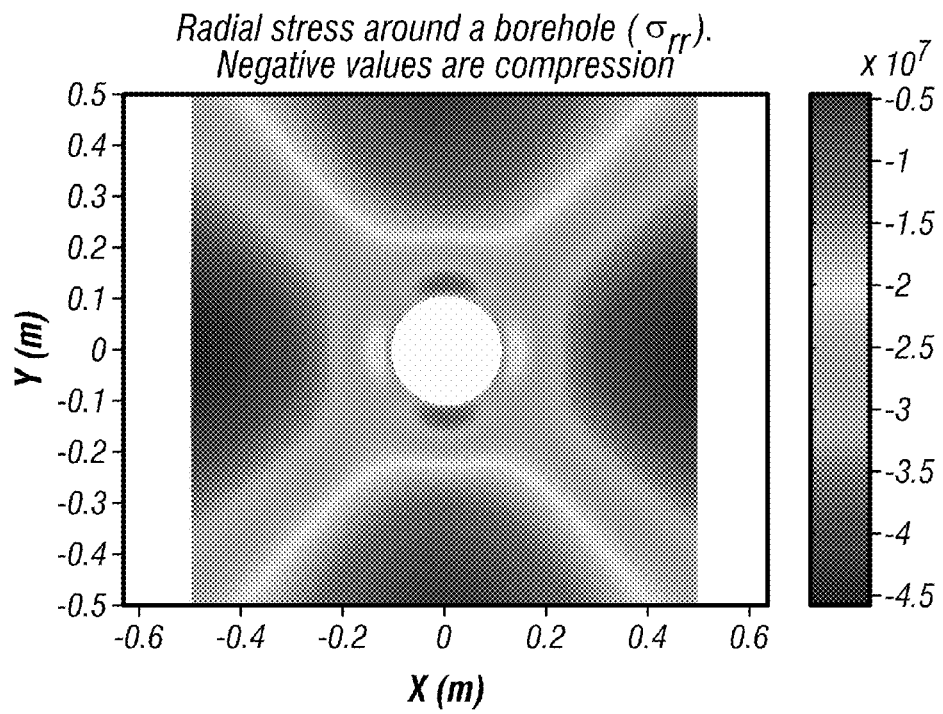
FIGS. 2A-2C shows the radial, tangential and azimuthal shear stresses around a borehole.
Figure 2B:
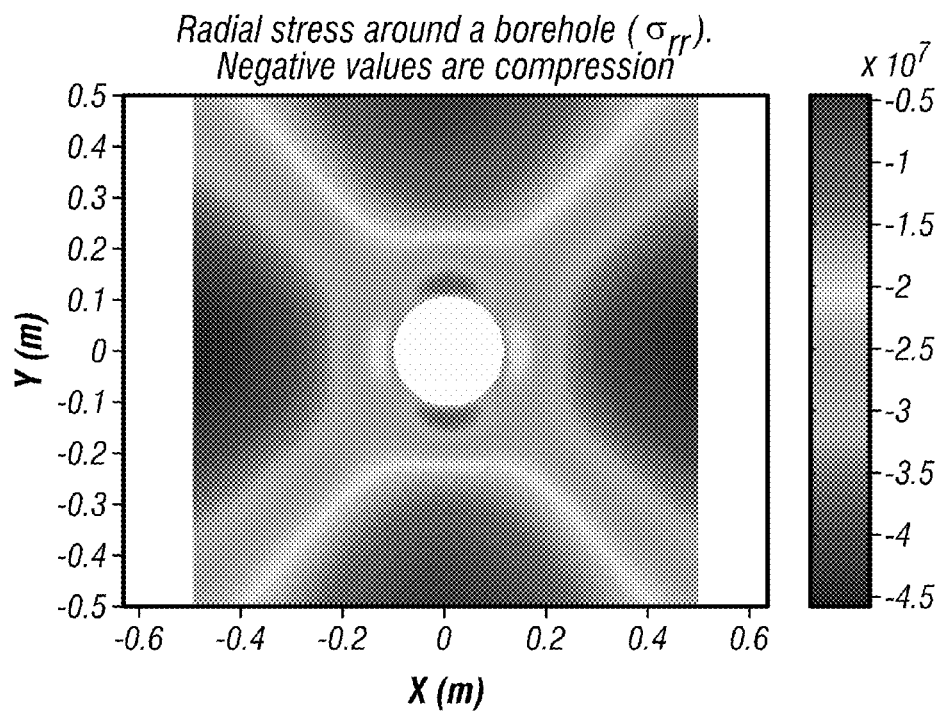
Figure 2C:
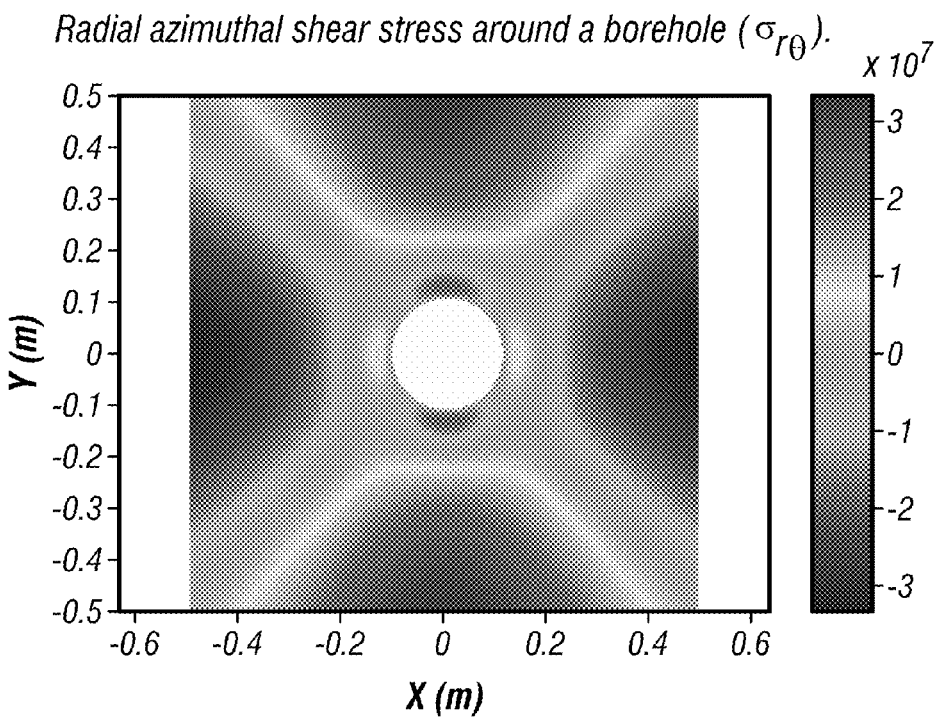

FIG. 2A shows the radial stress ($\sigma_{rr}$) around an exemplary borehole having a diameter of 8.5 inches (21.6 cm) when the initial stresses before the borehole was drilled were $\sigma_x$=−50 MPa (i.e., under tension) and $\sigma_y$=30 MPa. These values are for exemplary purposes only to illustrate the effects that may occur. FIG. 2B shows the tangential stress ($\sigma_{\theta\theta}$) and FIG. 2C shows the radial-azimuthal shear stress ($\sigma_{r\theta}$). These figures show that the stress around the borehole varies in both azimuthal and radial directions.

Figure 3A:
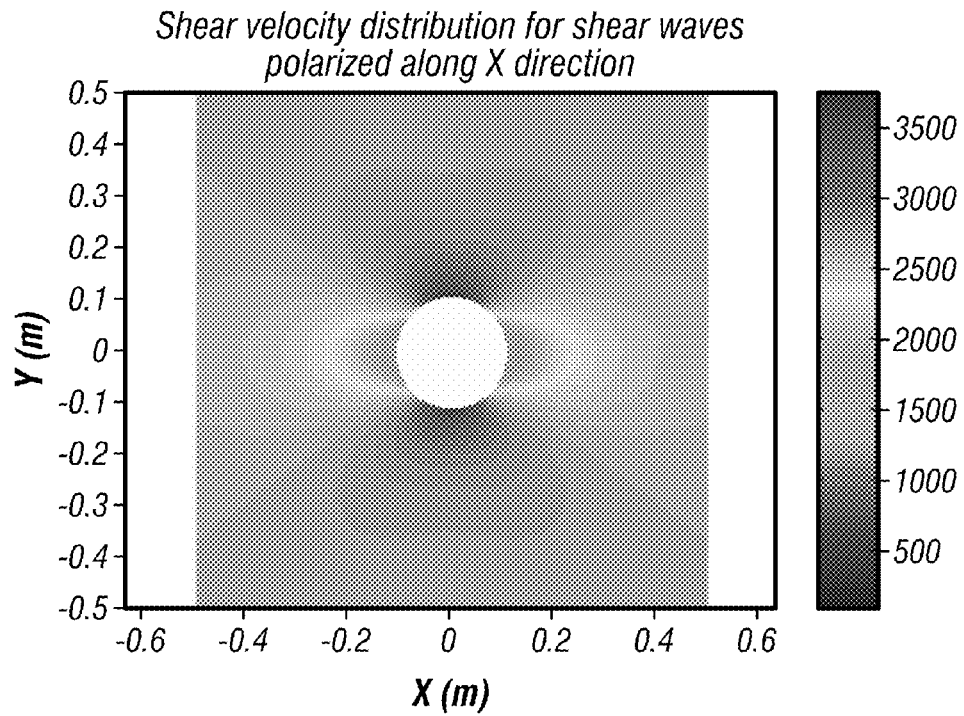
FIGS. 3A and 3B show plots of velocities of shear waves with x- and y-polarizations for the stress distribution of FIG. 2.
Figure 3B:
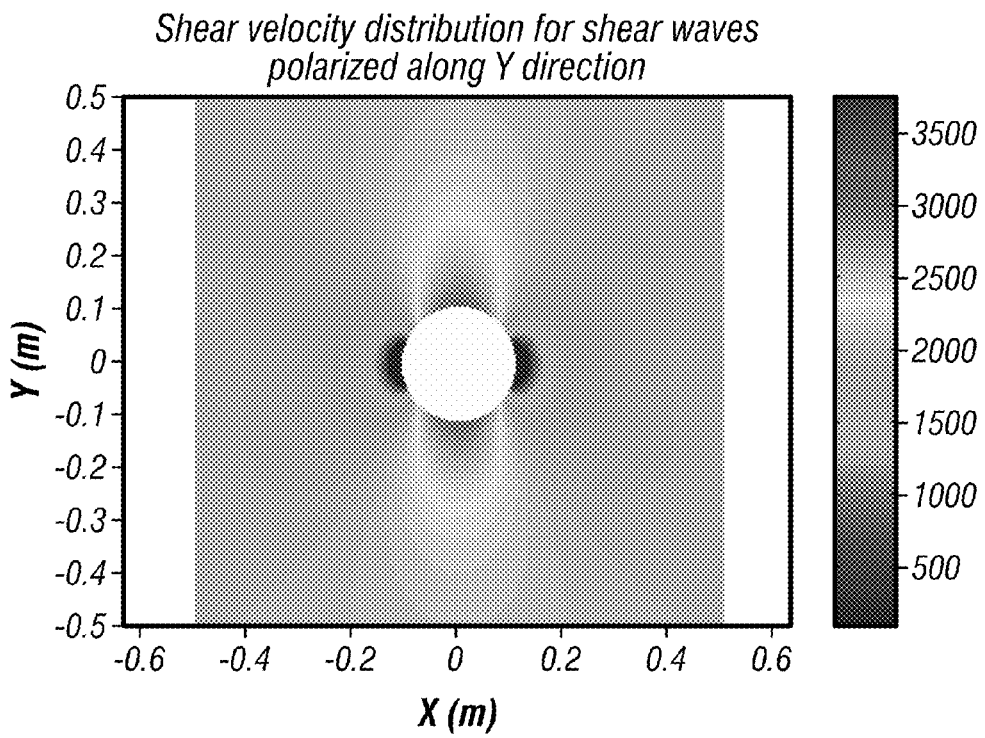
Figure 4:
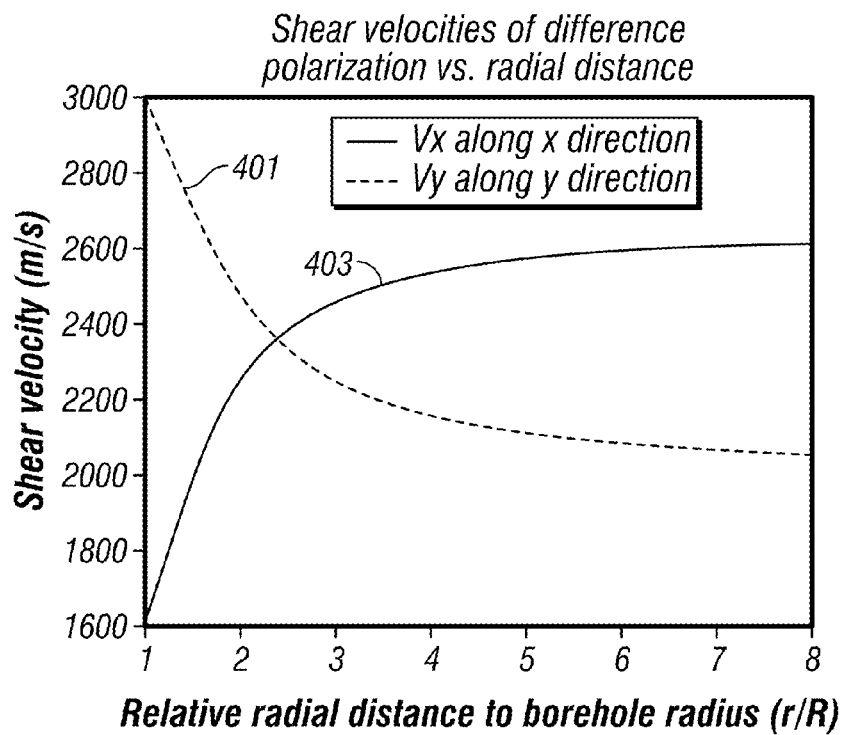
FIG. 4 illustrates the radial variation of the velocities of the fast and slow shear waves in a pre-stressed medium with a drilled borehole.

The complex distribution of stress around a borehole causes variation of the velocities of shear waves with different polarizations. Consider exemplary stress-velocity coefficients in eqn. (1) are: $S_{//}$=89213 (m/s)²/MPa and $S\perp$=31867 (m/s)²/MPa, which are typical of a sandstone. The stress condition and borehole size are the same as the previous example. The distribution of the velocities of vertically propagating shear waves with x- and y-polarizations are plotted in FIGS. 3A, and 3B respectively. Red areas have higher shear velocities than blue areas. Notice that the two figures have the same velocity-color mapping so that we can compare the velocities by the colors. As shown in FIG. 4, along the x direction, the velocity of the x-polarized shear wave is larger at infinity than that near the borehole 403. However, along the y direction, the velocity of the y-polarized shear wave is smaller at infinity than that near the borehole 401. The two curves of the two shear velocities cross over each other at a certain radial distance.

On the other hand, for a formation having intrinsic anisotropy, since the formation is homogenous, there is no difference between the far-field or near-field velocities. The shear velocity should be constant for each wave with a particular polarization.

The method to distinguish these two kinds of azimuthal anisotropy is to identify if there is a difference between the far-field and near-field velocities and if the velocities vary azimuthally as well. In borehole acoustic logging, this can be achieved by using broad band frequency sources and receivers. The energy of a low frequency dipole mode can leak deep into the formation to fetch the information far away from borehole, while the high frequency dipole mode only explores the formation near the borehole. Tang uses the shear velocities of monopole and dipole modes (at different frequencies) to estimate the radial variation in velocity.

Figure 5:
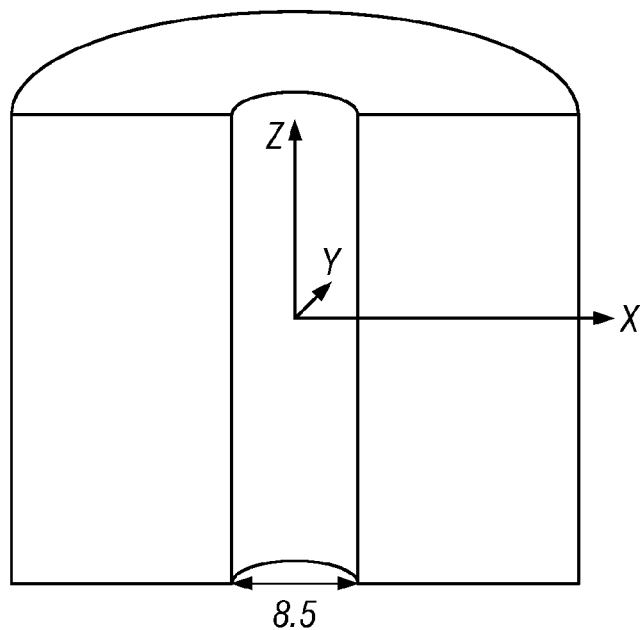
FIG. 5 shows the model used for numerical simulation.

The borehole in all the models for numerical simulation is shown in FIG. 5 and has a diameter of 8.5 inches with either a fast or a slow formation around it. Borehole fluid is 13.5 PPG oil based mud, whose density is 1.62 g/cc and velocity is 1246 m/s (or slowness is 245 μs/ft). The positions of the acoustic sources and receivers in the model simulate those of an XMAC Elite® cross-dipole acoustic logging tool of Baker Hughes Incorporated.

We first define models with intrinsic anisotropy. Both layered media (such as shale) and formations with oriented fractures can be modeled by the intrinsic anisotropy models. Most of the anisotropic rock formations are considered to be transversely anisotropic (TI) media. They have five independent elasticity constants. In order for the acoustic dipole logging to detect two distinct shear velocities, there must be an angle between the symmetry axis of the TI medium and the borehole axis. For simplicity here, we only consider the HTI configuration, in which the two axes are perpendicular to each other. So the elasticity tensor of these media has the following form, $$C = \begin{bmatrix} c_{11} & c_{12} & c_{13} & 0 & 0 & 0 \\ c_{12} & c_{22} & c_{12} & 0 & 0 & 0 \\ c_{13} & c_{12} & c_{11} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{44} \end{bmatrix}, \quad (3)$$

where $c_{13} = c_{11} - 2c_{55}$. The layers or fractures are parallel to x-z plane. Considering the shear waves propagating along the z axis (borehole axis), the speeds of shear waves polarized along x and y directions are $$v_{zx} = \sqrt{\frac{c_{55}}{\rho}}, \quad v_{zy} = \sqrt{\frac{c_{44}}{\rho}}, \quad (4)$$

where ρ is the density of the formation. Usually, $c_{55} > c_{44}$ and $v_{zx} > v_{zy}$.

| | Density (g/cc) | Elastic Constants (GPa) | | | | | |
|---|---|---|---|---|---|---|---|
| | | $C_{11}$ | $C_{22}$ | $C_{12}$ | $C_{13}$ | $C_{44}$ | $C_{55}$ |
| Formation | 2.35 | 22.59 | 15.07 | 5.1 | 8.03 | 5.26 | 7.28 |

The equivalent velocity and slowness of these two models are:

| | P-wave velocity (m/s) | | Shear velocity (m/s) | | P-wave slowness (μs/ft) | | Shear slowness (μs/ft) | |
|---|---|---|---|---|---|---|---|---|
| | Fast | Slow | Fast | Slow | Fast | Slow | Fast | Slow |
| Formation | 3100 | 2532 | 1760 | 1496 | 98.3 | 120.4 | 173.2 | 203.7 |

We next define the stress-induced anisotropy model. To configure this stress-induced anisotropy model, we start with an isotropic formation with its two stress-velocity coefficients, $S_{//}$ and $S\perp$.

| | Density (g/cc) | P-wave velocity (m/s) | Shear wave velocity (m/s) | $S_{//}$ (m/s)²/ MPa | $S\perp$ (m/s)²/ MPa | X direction horizontal compression (MPa) |
|---|---|---|---|---|---|---|
| Originally isotropic formation | 2.2 | 2900 | 1580 | 89213 | 31867 | 15 |

Figure 6:
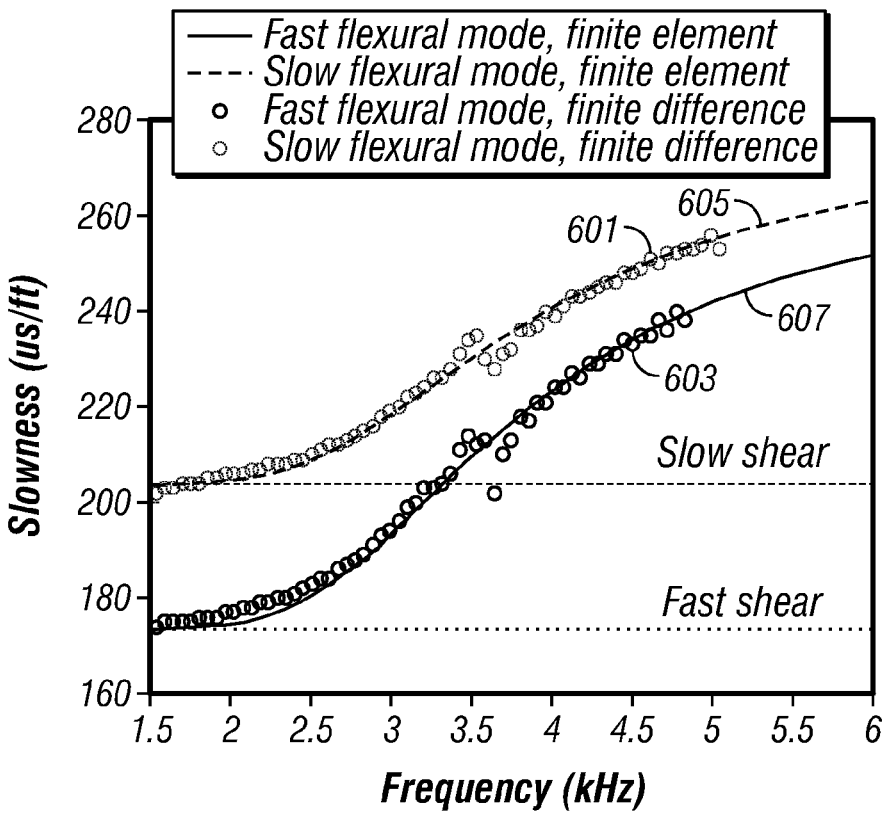
FIG. 6 show the fast and slow shear wave dispersion curves for an intrinsic HTI formation obtained using the finite difference and finite element simulations.

We first examine dipole modes for formations with intrinsic anisotropy. The 3D finite difference (FD) and finite element (FE) results for both the fast and slow dipole modes are shown in FIG. 6 for an HTI formation. In the above model configuration, the fast dipole mode has its direction along the x axis. In the case of intrinsic anisotropy, the fast dipole mode remains as the fast mode polarized along the x direction in the entire frequency range, while the slow dipole stays as the slow mode with polarization along the y direction. The open circles 601, 603 are for FD modeling and the curves 605, 607 are for FE modeling.

Figure 7:
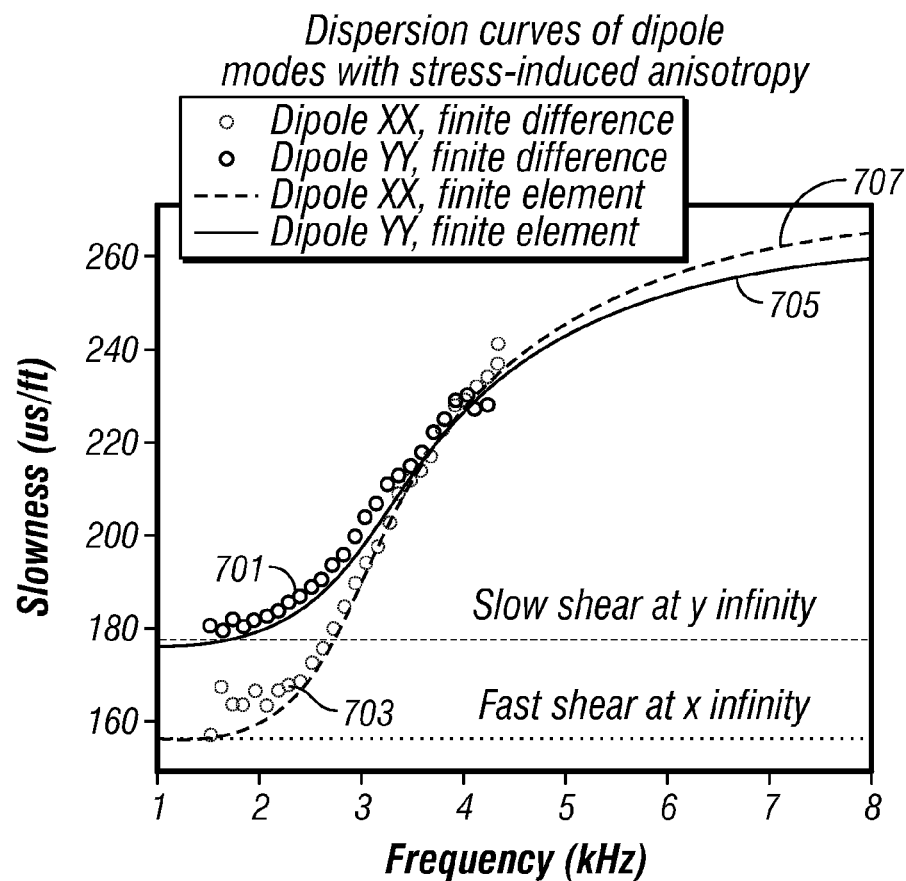
FIG. 7 shows fast and slow shear wave dispersion curves for a formation with stress-induced anisotropy.

We next consider the case of stress-induced anisotropy. The 3D FD and FE results of both the fast and slow dipole modes are shown in FIG. 7. At low frequency, the XX dipole mode 703, 707 (polarized along x direction) reaches the fast shear velocity caused by the compression along the x direction, and the YY dipole mode (polarized along y direction) reaches the slow shear velocity 701, 705. At frequencies higher than 4 kHz, the XX dipole becomes the slow mode while the YY dipole becomes the fast mode. Therefore, the fast mode at high frequency is polarized along the y direction which is 90° different from the polarization direction (the x direction) of the fast mode at low frequency. The phenomenon of azimuthal polarization angle change of the fast dipole mode at low and high frequencies is unique to stress-induced anisotropy and can be used to distinguish it from intrinsic anisotropy.

Based on the above theory, the present disclosure processes the azimuthal angles of the fast dipole modes at both low and high frequencies and calculates the angle difference to identify the intrinsic or stress-induced anisotropy. This method can use any azimuthal anisotropy analysis program for borehole acoustics, for example, WAVEXDAN. WAVEXDAN is developed by Baker Atlas with the use of cross-dipole borehole acoustic measurement. This program can calculate the azimuthal polarization angles of fast and slow dipole waves, as well as the anisotropy magnitude. First, we apply WAVEXDAN to get the azimuthal polarization angle $\alpha_L$ of the fast dipole mode at low frequency (for example, between 0.5 kHz to 3 kHz). Then, we filter the waveforms to keep the wave components of higher frequencies (for example, 4.5 kHz and higher) and use WAVEXDAN to process them again. This time we get the azimuthal polarization angle of the fast dipole mode at high frequency, $\alpha_H$. According to the theory, if the anisotropy is caused by stress, the difference between $\alpha_L$ and $\alpha_H$ is 90°. If the azimuthal angle of the two fast dipole modes are almost the same (the difference is close to zero), the anisotropy is intrinsic or caused by fractures. Sometimes the angle difference might be away from both 0 and 90° (say around 45°). In this situation, the dispersion curve cross-over method will have a difficulty in detecting the cross-over. Note that this disclosure does not need to calculate the fast and slow waveforms and does not need to calculate the dispersion cures as in the slowness method discussed in Sinha '215 and Donald '285.

Compared to the cross-over method, this disclosure has more physical meaning. The cross-over method needs to use the two principal directions of the dipole waves (the azimuthal angle of fast and slow dipole waves) at low frequencies to separate the original waveforms into the fast and slow waves that contain high frequency components. So the assumption there is that the two principal directions of low frequency waves are also the principal directions of the high frequency waves.

There is an implicit assumption in the foregoing that the orientations of the fast and slow dipole modes in the well as measured by the frequency-dependent dipole mode propagation properties do not vary slowly with distance from the wellbore wall, but rather that they may "flip" with the fast direction in the far-field becoming the slow direction close to the well. In fact, this "flip" in relative guided mode velocity with frequency is used as a diagnostic discriminator to differentiate between stress-induced anisotropy and anisotropy induced by earth layering. The aspect of the present disclosure which is discussed next does not make this assumption.

In one embodiment of the disclosure, an assumption is made that the vertical stress is a principal stress. It is known in the art to estimate the magnitude of the vertical stress by computing the weight of overlying rocks and fluids, and it is possible to measure the minimum principal stress from hydraulic fracturing or from extended leakoff tests. The orientation of the maximum horizontal stress can sometimes be determined from characteristics of wellbore failures. When wellbore failures are detected, one can often constrain the stress magnitudes because the width of a breakout or the occurrence of a drilling-induced tensile fracture can be directly related to the stresses acting around the well, and model representations of these features can be expressed in a manner similar to an image log or as a cross-section cut perpendicular to the wellbore. By matching such a model to such an observation, it is possible to constrain stress magnitudes and orientations. A limiting requirement of such constraints, for example, on the magnitude of the maximum horizontal stress, is that the rock strength that resists failure must be known a priori; this is often difficult to determine, as is known to those of ordinary skill in the art.

Figure 8:
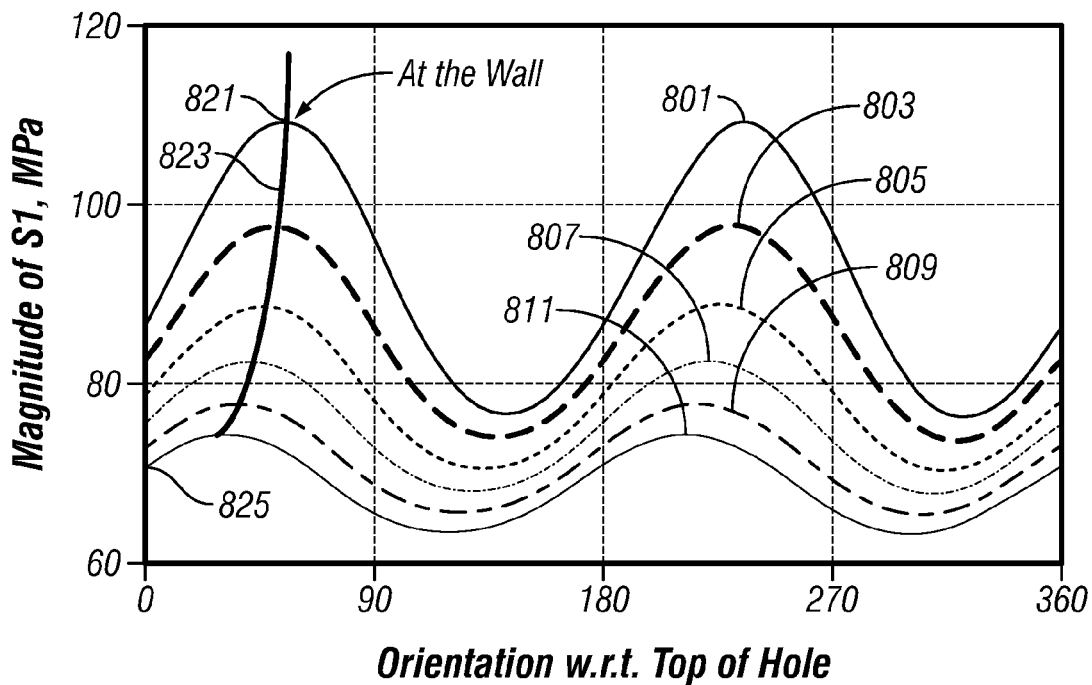
FIG. 8 shows an exemplary variation of one principal stress as a function of azimuth and distance for an exemplary deviated borehole.

Using the assumption that the vertical stress is a principal stress, the stress distribution around a deviated borehole can be modeled using prior art methods. The distribution of stresses around a deviated borehole is much more complex than the distribution of stresses around a vertical borehole discussed previously. This is discussed in detail in Peska and Zoback and is well known to those of ordinary skill. Shown in FIG. 8 is the maximum principal stress S1 (ordinate) as a function of azimuth (abscissa) around an exemplary deviated borehole at distances equal to 1.01 R (801), 1.1 R (803), 1.2 R (805), 1.3 R (807), 1.4 R (809) and 1.5 R (811), where radius of the borehole. Also shown in FIG. 8 is a curve 823 showing the azimuth as a function of distance from the well where the maximum principal stress is greatest for each radial distance. As can be seen, the difference in azimuth between the point 821 (which is on the borehole wall) of curve 823 and the point 825 of curve 823 (which is far away from the borehole wall) is not 90°.

Figure 9A:
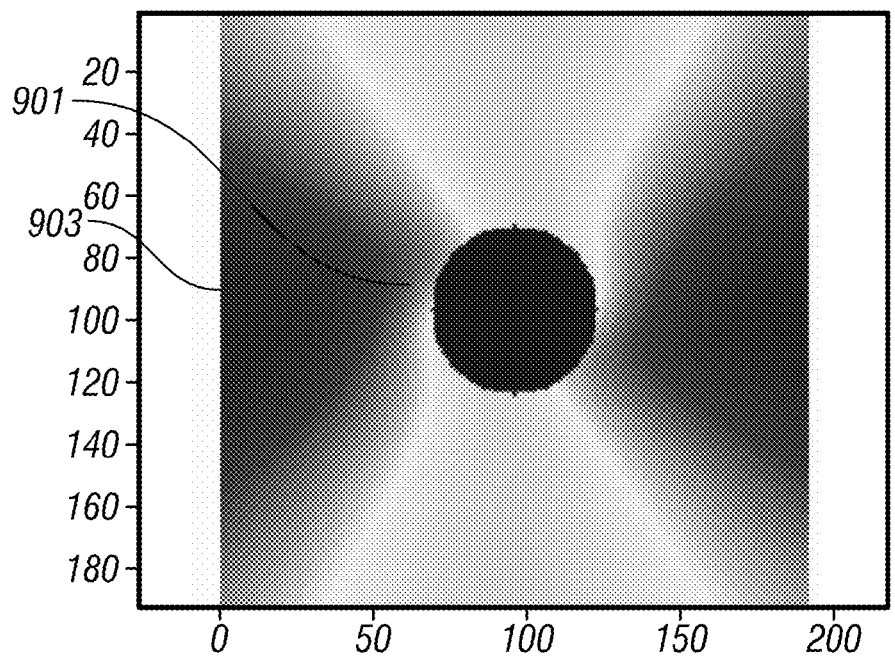
FIG. 9A shows the distribution of velocity of a shear wave polarized along the x-direction in a deviated borehole for the stress distribution of FIG. 8.
Figure 9B:
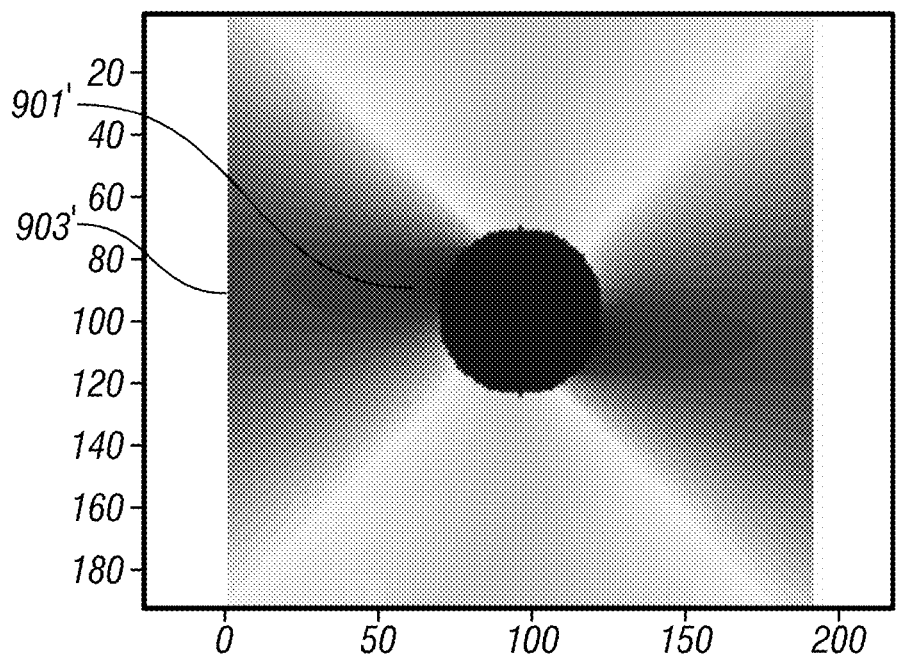
FIG. 9B shows the distribution of velocity of a shear wave polarized along the y-direction in a deviated borehole for the stress distribution of FIG. 8.

Using such a modeled stress distribution, it is possible to predict the velocities of elastic waves in the earth formation. FIG. 9A shows the distribution of shear wave velocities around the borehole for shear waves polarized in the x-direction corresponding to the exemplary stress distribution of FIG. 8. FIG. 9B shows the distribution of shear wave velocities around the borehole for shear waves polarized in the y-direction corresponding to the exemplary stress distribution of FIG. 8.

It can be seen that the x-polarized shear wave at location 903 is faster than the y-polarized shear wave at location 903'. It can also be seen that x-polarized shear wave at location 901 is slower than the y-polarized shear wave at location 901'. Thus, a crossover as predicted by the simple model does occur. However, FIGS. 9A and 9B also show that the azimuth angle at the borehole wall corresponding to the fastest and slowest velocities is not the same as the azimuth angle at the far offset, and the difference is not 90 degrees. In addition, there is a gradual transition of the velocities from the borehole wall to the far distances, showing that there is no single crossover angle at which the slow and fast modes are interchanged.

Figure 11:
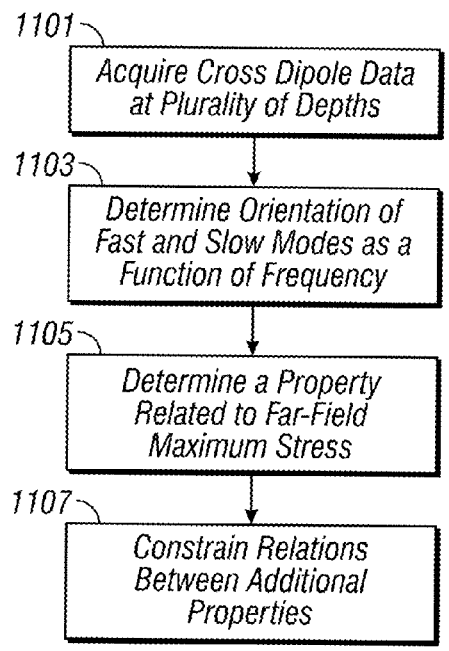
FIG. 11 is a flow chart illustrating some steps of the present disclosure.

In one embodiment of the disclosure, analysis proceeds according to the flow chart shown in FIG. 11. At 1101, cross-dipole data are acquired over a range of depths in the borehole. The cross-dipole data may be obtained using the apparatus described in U.S. Pat. No. 5,712,829 to Tang, having the same assignee as the present disclosure and the contents of which are incorporated herein by reference. At 1103, the orientations of fast and slow dipole modes in a wellbore as a function of frequency are determined. This step is a generalization of the methods described in Alford, 1986. One approach to generalizing this method which is not intended to be restrictive is to band pass filter the waveform arrivals at a series of receivers over a series of narrow frequency bands, independently rotate each set of the band passed data into the principal planes within the time range of each signal in which the bending mode arrives, and measure the angles relative to the borehole in which the fast and slow waves "bend" the wellbore within each frequency band using optimization criteria based on the ability to distinguish two unique signals within each frequency band.

At 1105, a property related to the orientation of the far-field maximum stress from the orientation of the fast direction at low frequency is determined. One property of the horizontal maximum stress orientation is the orientation itself. Another is a direction that is contained in a plane containing that orientation.

Using this information and knowledge of the wellbore orientation, along with prior art relationships between far-field stress magnitudes and orientations and the orientations and magnitudes of stresses near a wellbore, constraints are estimated 1107 of relationships between two or more of the following properties:
a. The far-field maximum principal stress magnitude
b. The far-field minimum principal stress magnitude
c. The far-field intermediate principal stress magnitude
d. Three angles that define the principal stress orientations, one description of which is:
   i. The inclination of the far-field maximum stress
   ii. The azimuth of the projection of the far-field maximum stress into a horizontal plane
   iii. The rake of the intermediate stress, S2 (that is, the angle from the horizontal to the intermediate stress in the S1-S2 stress plane).

The step at 1107 may utilize the same mathematical methods as are described in Peska and Zoback, 1995 and are implemented in GMI•SFIB. These methods and their application are discussed in Moos (2007) and Zoback et al. (2005). In one implementation that is not intended to be restrictive, plots such as are found in the Users' Manual of GMI•SFIB can be used to define relationships among unknown parameters. Other relationships between stresses in the far field and near the wellbore may be utilized, including relationships that relate stresses to physical properties of the rock or to changes in those physical properties.

A plot of the orientation of the fast dipole as a function of frequency within the ranges of each set of band-pass filtered data reveals the amount of rotation. The angle at the highest frequency band indicates the orientation near the wellbore wall, and the angle at the lowest frequency band is related to the orientation of the far field stress. If the difference is near zero, it is likely that the anisotropy is due to intrinsic properties of the formation and is not stress-induced, or if the difference is near 90°, it indicates that the anisotropy is stress-induced and that the well is likely drilled in a principal stress plane, but if the difference is less than 90° and more than zero, its value can be used to estimate properties of the stress field. The angles in the different frequency bands can be estimated by band-passing the cross-dipole data and performing a coordinate rotation. Details of the coordinate rotation are well known in the art. See, for example, Alford (1986). In one embodiment, the values of the velocities of the fast shear mode and the slow shear mode may be used to estimate the stresses. Eqn. (1) may be used for the purpose.

In another embodiment of the disclosure, the azimuth corresponding to the maximum stress at the borehole may be used to estimate bounds on the stresses. Peska and Zoback showed how to determine a stress magnitude from the rotation of a breakout azimuth away from the azimuth of the far-field maximum horizontal stress. Knowledge of this rotation allows one or more unknown properties of the stress field to be derived using a priori knowledge of other properties of the stress field. In the discussion that follows, we assume the known properties are the magnitude of $S_v$, and the magnitude of $S_{hmin}$.

Figure 10:
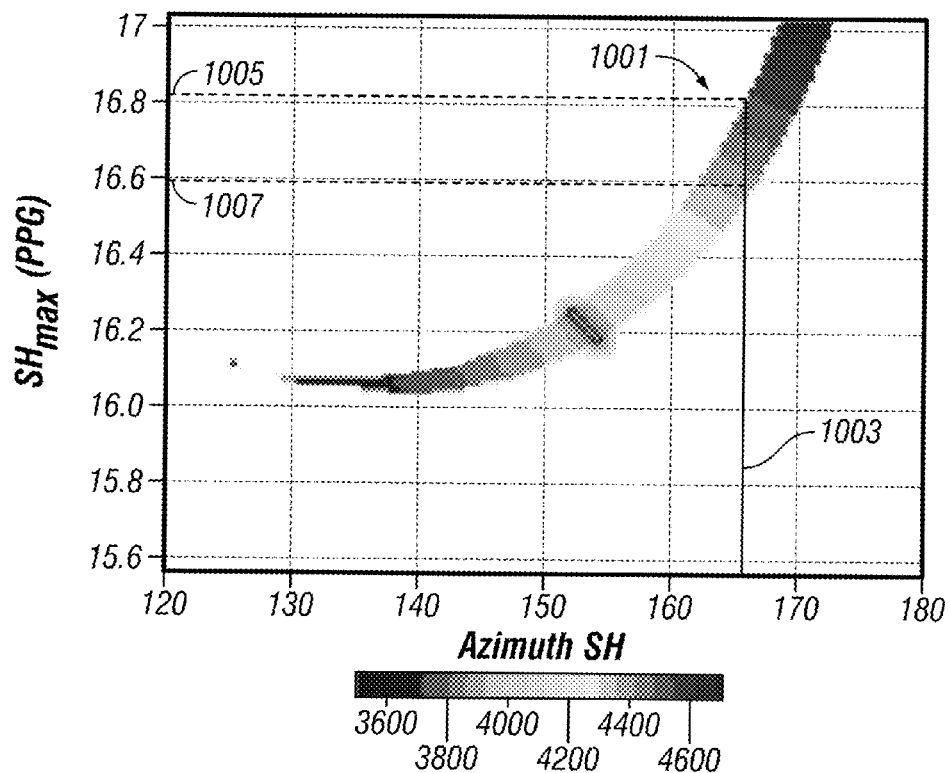
FIG. 10 shows constrains on the formation stress as a function of azimuth for the stress distribution of FIG. 8.

FIG. 10 is plotted assuming that the vertical stress is a principal stress, for simplicity and illustration. In FIG. 10, the abscissa is the azimuth of the far-field maximum horizontal stress, and the ordinate is the magnitude of the maximum far-field principal stress in pounds per gallon equivalent density (PPG). The colored band 1001 on this plot corresponds to the only combination of azimuth and magnitude for which a breakout in a given orientation (in this case the orientation of 821 in FIG. 8), could form in a particular well with a known deviation and deviation azimuth, and for a known overburden and least horizontal principal stress magnitude. The width of the band is due to uncertainty in the azimuth of the breakout, such uncertainty being a known property of observations of breakouts in wells. One edge of the band corresponds to the stress parameters required to match one limit of the range of breakout azimuths, and the other edge of the band corresponds to the stress parameters required to match the other limit of the range of breakout azimuths. In using the information contained in FIG. 10, if the azimuth of the far-field stress is uncertain, then two vertical lines corresponding to the upper and lower limits of the azimuths of the far-field stress can be used, and the range of possible stress magnitudes must lie between the upper and lower bounds of the four points on the edges of the colored band 1001 corresponding to the intersections of each of these vertical lines.

The vertical stress can be found by integrating the density of overlying rock; the minimum principal stress magnitude can be found from prior art methods such as fracture closure pressure, leakoff tests, using Eaton's or other known methods for pore pressure/fracture gradient prediction. The wellbore orientation can be measured in a variety of ways, such as by conventional survey techniques.

The breakout orientation is the orientation at the wellbore where S1 is greatest (821). That direction is also the direction corresponding to the orientation around the well in FIG. 9 where the shear velocities are greatest (901). So the near-well orientation where the shear velocities are greatest is the orientation where the near-well stress is greatest which is where a breakout would form.

Because the breakout azimuth is the same as the azimuth where the shear velocities are greatest (they are both controlled by the azimuth where S1 is greatest at the well) it is possible to replace the breakout azimuth as an input to analyses such as in FIG. 10 with the azimuth of the high-frequency fast dipole (901). i.e., the position of the colored band in FIG. 10 would be the same if the input were the azimuth of the high-frequency fast dipole instead of the azimuth of a breakout. This is an advantage over using a breakout azimuth to determine the azimuth near the well where S1 is greatest, because (1) breakouts don't always form, and (2) even if they do form, it is not always possible to measure their azimuth.

Using the information derived from the dipole analysis (the azimuths of the low-frequency fast dipole and of the high-frequency fast dipole), it is thus possible to determine the maximum stress magnitude using the information in FIG. 10. This is done by first determining the far-field maximum horizontal stress azimuth from the azimuth of the fast dipole mode at low frequency. This may be represented by the vertical line 1003. Then the bounds on the stress are given by the values 1005, 1007. In the same manner as described above for analyses using the breakout azimuth, the range of possible stress magnitudes is due to the fact that the region of possible stress states has a finite width, the width being computed from an uncertainty in the observed azimuth of the breakout or in the azimuth of the fast dipole at high frequency. Pairs of lines corresponding to the upper and lower limits of the range of orientations of the fast dipole mode at low frequency can be used to define the range of possible stress magnitudes that also account for uncertainty in the far-field stress orientation.

The example of FIGS. 9A-9B show that given a stress distribution, it is possible to predict the distribution of shear velocities by azimuth, distance and polarization. In one embodiment of the disclosure, a table lookup or other type of inversion is used to estimate the unknown parameters of the stress distribution from measurements of shear velocities. At the very least, it is possible to use the difference between the near borehole (high frequency) and the far-field (low frequency) orientations to estimate the minimum and maximum horizontal stresses in the formation. The velocity measurements made at intermediate frequencies provide indications of the velocity at intermediate distances.

Figure 12:
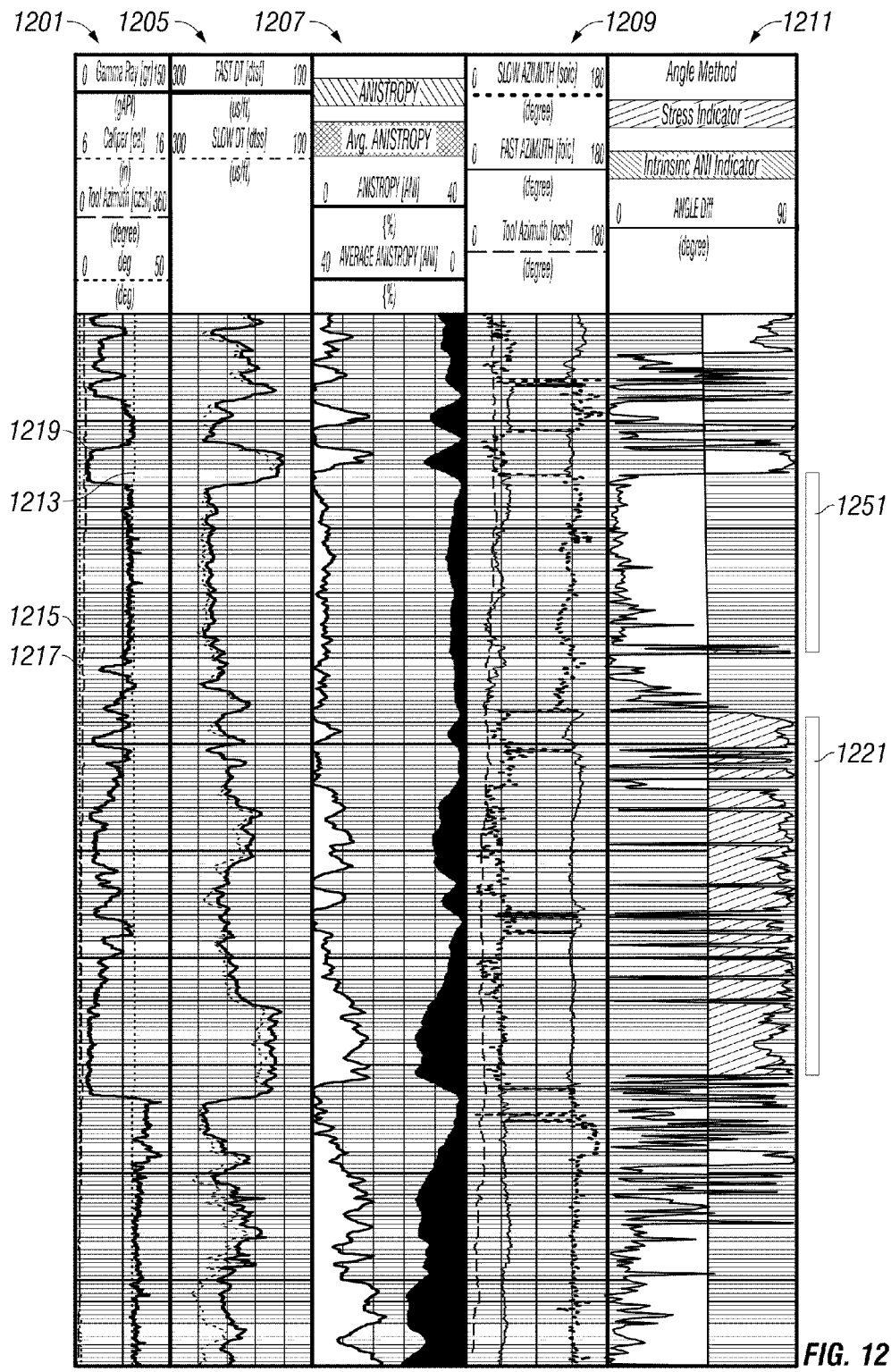
FIG. 12 shows data and results of processing in a vertical borehole that shows stress-induced anisotropy in sands and intrinsic anisotropy in shales.
Figure 13:
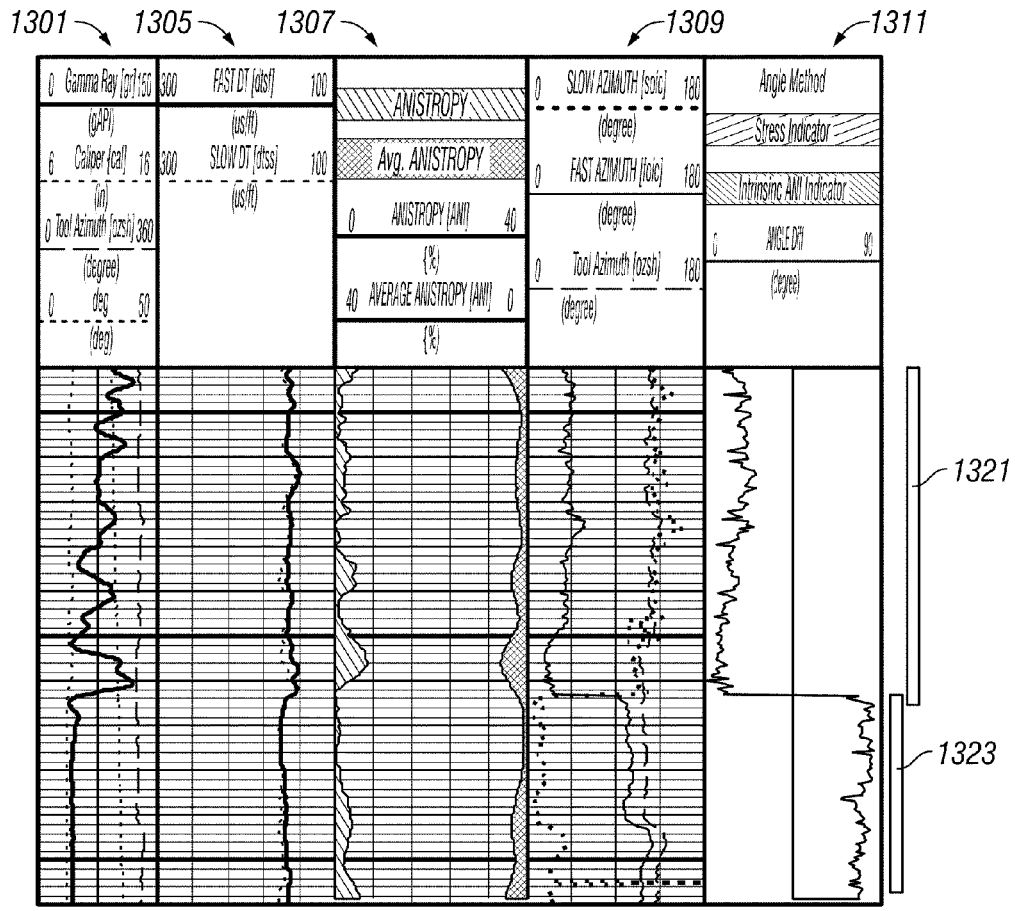
FIG. 13 shows data and results in a deviated borehole showing stress-induced anisotropy in sands and intrinsic anisotropy in shales.

FIG. 12 shows an example of well logs acquired and processed with cross-dipole measurements. Track 1 1201 includes the gamma ray 1219 log which is an indication of shalyness. The caliper 1213 shows that the borehole has uniform gauge (12.5 inches). The tool azimuth 1215 is constant, indicating that the tool is not rotating. The borehole deviation 1217 is close to zero, Track 3 1205 shows the slowness of the two shear waves, Track 4 1207 shows the estimated anisotropy at the borehole. Track 5 1209 shows the azimuths of the fast and slow shear waves at the borehole. Track 6 1211 is a plot of the difference between the azimuthal polarization angles $\alpha_L$ and $\alpha_H$ defined above. Values of the difference in angles 1221 near 0°, say 3° or less, are suggestive of intrinsic anisotropy while greater values are indicative of the presence of stress induced anisotropy, while there may still be intrinsic anisotropy. Values close to 90° are indicative of stress-induced anisotropy of a wellbore drilled in a principal stress plane. Note that in the shale interval 1251 intrinsic anisotropy is indicated while in the sand 1221 below (see gamma ray log 1219), stress induced anisotropy is indicated.

FIG. 12 shows plots similar to FIG. 11 in a deviated well. Track 1 1201 includes the gamma ray, caliper, azimuth and borehole deviation. Track 3 1205 shows the slowness of the two shear waves, Track 4 1207 shows the estimated anisotropy at the borehole. Track 5 1209 shows the azimuths of the fast and slow shear waves. Track 6 1211 is a plot of the difference between the azimuthal polarization angles $\alpha_L$ and $\alpha_H$. Again, we note that in the upper, shaly, interval there is intrinsic anisotropy while in the lower, sandy interval, stress-induced anisotropy is indicated. Note further that in the upper portion of the shale interval 1221, the difference is close to 20°. This suggests that the shale interval also has some stress-induced anisotropy. An explanation of the difference close to 0° in the vertical shale interval 1151 in FIG. 11 is that the intrinsic anisotropy is much greater than the stress induced anisotropy.

Once the orientation and/or magnitudes of the principal stress directions have been determined, this information can be used to control further drilling operations. For example, U.S. Pat. No. 7,181,380 to Dusterhoft et al, having the same assignee as the present disclosure and the contents of which are incorporated herein by reference teaches a process to determine optimal completion type and design prior to drilling of a hydrocarbon producing well. Moos (2006) discloses methods for selecting mud and casing design. Castillo et al (1987) disclose determination of maximum column height for assessment of the economic value of oil in place. U.S. Pat. No. 7,349,807 to Moos teaches the evaluation of risk in pore pressure prediction.

The present disclosure has been described above in terms of a wireline implementation. The method of the present disclosure may also be used in a measurement-while-drilling (MWD) implementation.

The processing of the measurements made in wireline applications may be done by the surface processor 20, by a downhole processor, or at a remote location. The data acquisition may be controlled at least in part by the downhole electronics. Implicit in the control and processing of the data is the use of a computer program on a suitable machine readable-medium that enables the processors to perform the control and processing. The machine-readable medium may include ROMs, EPROMs, EEPROMs, flash memories and optical disks. The term processor is intended to include devices such as a field programmable gate array (FPGA).

While the foregoing disclosure is directed to specific embodiments of the present disclosure, various modifications will be apparent to those skilled in the art. It is intended that all variations within the scope of the appended claims be embraced by the foregoing disclosure.

What is claimed is:

1. A method of characterizing shear wave anisotropy in a formation, comprising:
   obtaining cross dipole measurements over a range of frequencies over a range of depths in a borehole penetrating the formation;
   estimating a first azimuthal direction of a fast shear mode near the borehole using a high frequency component of the measurements;
   estimating a second azimuthal direction of a far-field fast shear mode using a low frequency component of the measurements; and
   using a model in which there is a gradual transition of the azimuthal direction of the fast shear mode from near the borehole to the far field, the estimated first azimuthal direction and the estimated second azimuthal direction for at least one of: (i) estimating a property of a stress field in the formation, or (ii) providing an indication of intrinsic anisotropy of the formation.

2. The method of claim 1 further comprising:
   marking a selected depth of the formation as having intrinsic anisotropy if at the selected depth the magnitude of the difference between the estimated first azimuthal direction and the estimated second azimuthal direction is less than about 3°.

3. The method of claim 1 further comprising:
   marking a selected depth of the borehole as being in a principal stress plane of the formation if at the selected depth the magnitude of the difference between the estimated first azimuthal direction and the normal to the estimated second azimuthal direction is less than about 3°.

4. The method of claim 1 wherein the estimated property of the stress field further comprises a principal stress direction.

5. The method of claim 1 wherein the estimated property of the stress field further comprises a magnitude of a principal stress of the formation, the method further comprising using a relation between a velocity of the fast shear mode, a velocity of a slow shear mode, and a relation between the velocity of the fast shear mode, the velocity of the slow shear mode, and two principal stresses in the formation.

6. The method of claim 1 wherein estimated the first azimuthal direction and the second azimuthal direction further comprises:
   (i) band-passing the cross dipole measurements; and
   (ii) performing an Alford rotation of the results of the band-passing to provide the fast dipole mode and a slow dipole mode.

7. The method of claim 1 further comprising using the estimated property of the stress field to conduct a further operation selected from:
   (i) determining a completion type, (ii) designing a completion type, (iii) selecting mud for drilling operations, (iv) designing a casing for completion, (v) determination of economic value of a reservoir, or (vi) evaluation of a risk in pore pressure prediction.

8. The method of claim 1 wherein the estimated property of the stress field further comprises a magnitude of a principal stress of the formation in a horizontal plane, the method further comprising using the first azimuthal direction, the second azimuthal direction, and a vertical stress at the borehole.

9. An apparatus for characterizing an earth formation, comprising:
   a logging tool configured to obtain cross dipole measurements over a range of frequencies over a range of depths in a borehole penetrating the formation; and
   at least one processor configured to:
   (i) estimate a first azimuthal direction of a fast shear mode near the borehole using a high frequency component of the measurements;
   (ii) estimate a second azimuthal direction of a far-field fast shear mode using a low frequency component of the measurements; and
   (iii) use a model in which there is a gradual transition of the azimuthally direction of the fast shear mode from near the borehole to the far field, the estimated first azimuthal direction and the estimated second azimuthal direction to provide at least one of: (A) an estimate of a property of a stress field in the formation, and (B) an indication of intrinsic anisotropy in the formation.

10. The apparatus of claim 9 wherein at least one the processor is further configured to:
    mark a selected depth of the formation as having intrinsic anisotropy if at the selected depth the magnitude of the difference between the estimated first azimuthal direction and the estimated second azimuthal direction is less than about 3°.

11. The apparatus of claim 9 wherein the at least one processor is further configured to:
    mark a selected depth of the borehole as being in a principal stress plane of the formation if at the selected depth the magnitude of the difference between the estimated first azimuthal direction and normal to the estimated second azimuthal direction is less than about 3°.

12. The apparatus of claim 9 wherein the property of the stress field that the at least one processor is configured to estimate further comprises a principal stress direction.

13. The apparatus of claim 9 wherein the property of the stress field that the at least one processor is configured to determine further comprises a magnitude of a principal stress in a horizontal direction of the formation, the at least one processor being further configured to use a relation between a velocity of the fast shear mode, a velocity of a slow shear mode, and a relation between the velocity of the fast shear mode, the velocity of the slow shear mode, and two principal stresses in the formation.

14. The apparatus of claim 9 wherein the at least one processor is further configured to estimate the first azimuthal direction and the second azimuthal direction by further performing:
    (i) a band-passing of the cross dipole measurements; and
    (ii) performing an Alford rotation of the results of the band-passing to provide the fast dipole mode and a slow dipole mode.

15. The apparatus of claim 9 wherein the at least one processor is further configured to use the estimated property of the stress field to conduct a further operation selected from:
    (i) determining a completion type, (ii) designing a completion type, (iii) selecting mud for drilling operations, (iv) designing a casing for completion, (v) determination of economic value of a reservoir, or(vi) evaluation of a risk in pore pressure prediction.

16. The apparatus of claim 9 further comprising a conveyance device configured to convey the logging tool into the borehole, the conveyance device selected from: (i) a wireline, or (ii) a drilling tubular.

17. The apparatus of claim 9 wherein the property of the stress field that the at least one processor is configured to determine further comprises a magnitude of a principal stress in a horizontal direction of the formation, the at least one processor being further configured to use the first azimuthal direction, the second azimuthal direction, and a vertical stress at the borehole.

18. A non-transitory computer-readable medium product having instructions thereon that when read by at least one processor, cause the at least one processor to execute a method, the method comprising:
    estimating from cross dipole measurements obtained over a range of frequencies over a range of depths in a borehole a first azimuthal direction of a fast shear mode near the borehole using a high frequency component of the measurements;
    estimating a second azimuthal direction of a far-field fast shear mode using a low frequency component of the measurements; and
    using a model in which there is a gradual transition of the direction of the fast shear mode from near the borehole to the far field, the estimated first azimuthal direction and the second estimated azimuthal direction to provide at least one of: (i) an estimate of a property of a stress field in the formation, or (ii) an indication of intrinsic anisotropy of the formation.

19. The non-transitory computer-readable medium of claim 18 further comprising at least one of: (i) a ROM, (ii) an EPROM, (iii) an EEPROM, (iv) a flash memory, or (v) an optical disk.

* * * * *